(12) United States Patent
Gamperling et al.

(10) Patent No.: US 12,204,175 B2
(45) Date of Patent: Jan. 21, 2025

(54) DATA RECORD FOR USE IN A METHOD FOR PRODUCING A SPECTACLE LENS

(71) Applicant: Carl Zeiss Vision International GmbH, Aalen (DE)

(72) Inventors: Michael Gamperling, Leipheim (DE); Helmut Wietschorke, Aalen (DE); Peter Johann Haas, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 660 days.

(21) Appl. No.: 17/412,543

(22) Filed: Aug. 26, 2021

(65) Prior Publication Data
US 2021/0382330 A1    Dec. 9, 2021

Related U.S. Application Data

(63) Continuation of application No. PCT/EP2020/055265, filed on Feb. 28, 2020.

(30) Foreign Application Priority Data

Mar. 1, 2019   (EP) .................... 19160269

(51) Int. Cl.
G02C 13/00    (2006.01)

(52) U.S. Cl.
CPC .................. *G02C 13/005* (2013.01)

(58) Field of Classification Search
CPC ........................... G02C 13/005; G02C 13/003
(Continued)

(56) References Cited

U.S. PATENT DOCUMENTS

| 7,384,144 B2 | 6/2008 | Ross-Messemer et al. |
| 8,388,133 B2 | 3/2013 | Freson et al. |

(Continued)

FOREIGN PATENT DOCUMENTS

| CN | 101965536 A | 2/2011 |
| DE | 102008012268 A1 | 9/2009 |

(Continued)

OTHER PUBLICATIONS

Industrial Norm "Ophthalmic optics—Spectacle lenses—Vocabulary (ISO 13666:2012)," German and English version EN ISO 13666:2012, Oct. 2013.
(Continued)

*Primary Examiner* — Tuyen Tra
*Assistant Examiner* — Rahman Abdur
(74) *Attorney, Agent, or Firm* — Tautz & Schuhmacher LLC; Georg Hasselmann

(57) ABSTRACT

A data record contains at least the following data values: spatial coordinates of a reference point at each eye of the wearer; a spatial direction vector for specifying a viewing direction of the wearer through the spectacle lens; and a spatial rim curve or edge curve. The data record can be used to produce a spectacle lens. A method and a computer program for generating the data record, and a method for producing the spectacle lens are also disclosed. It is possible to produce the spectacle lens after a single capture of a data record for adapting the spectacle lenses to the wearer of the pair of spectacles and to the spectacle frame selected by the wearer. A different spectacle lens as the spectacle lens originally selected can subsequently be used as the spectacle lens without having to record a further data record for the adaptation for the wearer.

15 Claims, 3 Drawing Sheets

(58) Field of Classification Search
USPC .................................... 351/204, 205, 206
See application file for complete search history.

(56) References Cited

U.S. PATENT DOCUMENTS

| | | | |
|---|---|---|---|
| 8,992,014 | B2 | 3/2015 | Esser et al. |
| 9,971,172 | B2 | 5/2018 | Cabeza-Guillen et al. |
| 10,216,010 | B2 | 2/2019 | Tiemann et al. |
| 10,564,446 | B2 | 2/2020 | Nieuwenhuis et al. |
| 2009/0021693 | A1 | 1/2009 | Sessner et al. |
| 2010/0128220 | A1 | 5/2010 | Chauveau |
| 2014/0253875 | A1 | 9/2014 | Le Gallou et al. |
| 2017/0269384 | A1 | 9/2017 | Tiemann et al. |
| 2018/0031868 | A1 | 2/2018 | Tadokoro et al. |
| 2018/0149886 | A1 | 5/2018 | Zweerts et al. |
| 2019/0033624 | A1* | 1/2019 | Breuninger .......... G02C 13/005 |
| 2020/0218095 | A1 | 7/2020 | Gamperling et al. |
| 2020/0233239 | A1 | 7/2020 | Schwarz et al. |

FOREIGN PATENT DOCUMENTS

| | | |
|---|---|---|
| DE | 102011115239 A1 | 3/2013 |
| DE | 102014012452 A1 | 2/2016 |
| DE | 102016004430 A1 | 10/2017 |
| DE | 102016113374 B3 | 10/2017 |
| EP | 2028529 A1 | 2/2009 |
| EP | 3422087 A1 | 1/2019 |
| EP | 3425446 A1 | 1/2019 |
| JP | 2010243827 A | 10/2010 |
| JP | 2016143861 A | 8/2016 |
| WO | 2005069063 A1 | 7/2005 |
| WO | 2018137863 A1 | 8/2018 |
| WO | WO 2018/224515 A1 | 12/2018 |

OTHER PUBLICATIONS

Borza et al. "Eyeglasses Lens Contour Extraction from Facial Images Using an Efficient Shape Description," Sensors, vol. 13, pp. 13638 to 13658, 2013.

PCT Collaborative Search and Examination Pilot peer contribution by the USPTO, uploaded Apr. 29, 2020.

PCT Collaborative Search and Examination Pilot peer contribution by the Chinese Patent Office, uploaded May 11, 2020.

PCT Collaborative Search and Examination Pilot peer contribution by the Japanese Patent Office, uploaded May 12, 2020.

PCT Collaborative Search and Examination Pilot peer contribution by the Korean Patent Office, uploaded May 14, 2020.

International Search Report issued in PCT/EP2020/055265, to which this application claims priority, mailed Jun. 4, 2020, and English-language translation thereof.

Written Opinion issued in PCT/EP2020/055265, to which this application claims priority, mailed Jun. 4, 2020.

Office Action by the European Patent Office issued in EP 2020 706 328.0, which is a counterpart hereof, mailed Oct. 18, 2023, and English-language translation thereof.

* cited by examiner

DATA RECORD FOR USE IN A METHOD FOR PRODUCING A SPECTACLE LENS

CROSS REFERENCE TO RELATED APPLICATIONS

This application is a continuation application of international patent application PCT/EP2020/055265, filed Feb. 28, 2020, designating the United States and claiming priority from European patent application EP 19160269.7, filed Mar. 1, 2019, and the entire content of both applications is incorporated herein by reference.

TECHNICAL FIELD

The present disclosure relates to a data medium-stored data record for use in a method for producing a spectacle lens, a method and a computer program for generating the data record, and a method for producing the spectacle lens.

BACKGROUND

The related art has disclosed storage medium-stored data records used in methods for producing spectacle lenses, associated methods and computer programs for generating the data records, and methods for producing the spectacle lens.

The DIN EN ISO 13666:2013-10 standard (referred to as "standard" below), in the meantime superseded by DIN EN ISO 13666:2019-12, defines basic terms of ophthalmic optics, in particular terms for spectacle lens semifinished products, which are also referred to as "spectacle lens blanks," relates to the finished spectacle lenses, in particular to a multiplicity of parameters that relate to the finished spectacle lenses or to a spectacle frame, selected by a wearer of the pair of spectacles, for at least introducing the spectacle lenses, and sets methods for adapting the spectacle lenses to the wearer of the pair of spectacles and to the spectacle frame selected by the wearer. In the present disclosure, references to the standard are references to DIN EN ISO 13666:2013-10. Using this standard, the method for adapting the spectacle lenses to the spectacle frame selected by the wearer is usually performed as part of a visit of the wearer to an optician, according to the following sequence with method steps specified below:

"determining the correction": performing subjective refraction to determine a necessary correction of refractive errors of the eyes of the wearer of the pair of spectacles, wherein use is made of already known values captured by measurements, for example from an ophthalmic prescription from the user, and/or wherein an objective refraction of both eyes of the wearer can be ascertained by performing a refraction determination using a known refractometer;

"selecting a spectacle frame": selecting at least one spectacle frame by the wearer;

"determining centration data": creating a centration recording with a pair of spectacles worn by the wearer under habitual head posture and a defined viewing direction of the wearer through the spectacle lens, a lens type for the spectacle lenses and hence, implicitly, an associated centration prescription for adapting the spectacle lenses to the spectacle frame already being set; and "lens selection": selecting a lens by the user and optician, the "lens selection" determining properties of the lens, in particular the lens type, a refractive index, a tint and at least one coating of a spectacle lens, the lens type being used in the determination of the centration prescription.

A disadvantage of this sequence is that the steps of "determining centration data" and "lens selection" take place in the aforementioned order. A problem often arising in this case is that the selection of the lens type made by the optician and hence the selection of the associated centration prescription can become obsolete. In particular, such a problem may occur if the user subsequently selects a different spectacle lens or if the selected spectacle lens cannot be supplied with the parameters required for the correction, e.g., in respect of diameter, thickness or equipment. Since different lens types can be linked to different centration prescriptions, this is accompanied by a change in the centration prescription, which is the basis for determining the centration parameters. This change makes the already determined centration data obsolete, and the determination of the centration data must be repeated by the optician under the altered boundary conditions, for which it may be necessary to perform all of the aforementioned method steps again in the presence of the wearer.

Furthermore, there is the problem that centration data, which are ascertained by applying the present standard, only insufficiently capture a real wearing situation of a pair of spectacles by the wearer, since the standard makes exemplary simplifications and omissions. This includes, in particular, measured values only determined on one side but used on both sides when determining the corneal vertex distance, the assumption of a "lens plane," which can also be referred to as a "glass plane," instead of a respective curved surface of the spectacle lenses, the position of interfaces, the sole use of a boxed system instead of a complete edge curve of the uncut spectacle lenses according to the standard, section 8.4.7 thereof, and the assumption of identical dimensions for both eyes of the wearer.

A comparable problem may arise when calculating both lens surfaces of the spectacle lenses, which is also referred to as a "lens calculation," before processing spectacle lens blanks in the factory. According to the aforementioned standard, the lens calculation proceeds from the centration data of the respective spectacle lens, in particular on the values x, y, A, B, FSW and the pantoscopic angle, which are defined in more detail in the standard and in the following text, determines therefrom a three-dimensional arrangement of the lens plane and eyes, and thus determines the optimal profiles of the two lens surfaces for all possible viewing directions through the spectacle lens. Since, pursuant to the aforementioned standard, centration data are specified in relation to a simplified model in which the two spectacle lenses of a spectacle frame are approximated by two lens planes which are at an angle to one another, deviations in relation to the actual geometry can occur during a back calculation. This effect predominantly occurs if the manufacturer of the spectacle lenses differs from the manufacturer of a centration appliance.

A further problem arises if when further corrections of the centration data are made, in particular by the optician, which further corrections may comprise a correction of a head rotation of the wearer into a so-called "clean straight alignment," also referred to as "auto-X" correction, or an adaptation of a head posture in an image recording, e.g., a pitch angle, to a reference or comparison head posture, which is also referred to as "auto-Y" correction. These corrections are included in the calculation of the centration data, and so it is is longer possible to tell from the result whether and which corrections were applied.

According to the present standard, the centration data are specified in relation to an spectacle frame coordinate system and/or a lens coordinate system. However, these are generally not aligned exactly parallel and/or perpendicular in space. Therefore, a lateral tilt of the head can lead to an axis position of a spectacle lens in the worn position deviating from the axis position ascertained in relation to the head of the user when performing a refraction determination. In this case, the head of the wearer is generally forced into a neutral position, which is oriented with respect to the vertical of the employed refractometer. Moreover, the optician uses the horizontal of the spectacle frame as orientation when cutting the spectacle lenses. However, a lateral tilt of the head leads to the eyes of the wearer, by way of involuntary turning about the viewing axis, compensating a tilting movement occurring as a result thereof. Hence, the eyes are rotated with respect to the spectacle frame and the spectacle lenses; in relation to the eye, the axis position deviates from the axis position during the refraction determination by a magnitude of the lateral tilt of the head or by a part thereof.

The same happens if the optician generally displaces a so-called "stamp image" in a vertical direction at the end of the centration procedure, as a result of which they implicitly also change the direction of view through the spectacle lens. However, this displacement is not communicated to the producer of the spectacle lens; instead, the calculation of the centration prescription and the manufacture of the spectacle lenses based thereon is implemented for a viewing direction that deviates from the assumed, habitual wearing position.

Comparable problems may arise in the case of a virtual centration. Here, the optician initially creates a virtual model of a section of the wearer, in particular of the head of the wearer, which is also referred to as an "avatar," to be precise under the same conditions as when creating the centration recording. However, the avatar is created without the user wearing a pair of spectacles at the time of the avatar's creation, in particular so as to decouple the selection of the spectacle frame in time and space from the visit of the user to the optician. Thus, by means of an Internet-based application, the wearer can use the avatar to put spectacle frames, which are available as a spatial model, on the avatar and to select the spectacle frames, for example from home. However, since the user is not wearing a pair of spectacles when the avatar is created, it is not possible to determine centration data. The choice of lenses, too, can be made only after the selection of the spectacle frame, especially due to the lack of data at this time in relation to the material and design of the spectacle lenses. The centration data can only be determined thereafter, either as a so-called "virtual centration" based on a spatial model of the spectacle frame placed on the avatar or as a so-called "real centration" on location at the optician following the manufacture and provision of the spectacle frame on the basis of the spatial model of the spectacle frame. Further problems may arise here if the optician has only a few of the usable models for spectacle frames physically available and therefore the centration data cannot be ascertained completely. A disadvantage of both configurations is that the centration data must be determined before the spectacle lenses are made available. However, in general, there is no way to convert centration data that relates to a specific centration prescription to other centration data that relates to another centration prescription, since the data and prescriptions required to this end are not available as a matter of principle.

WO 2005/069063 A1 discloses an apparatus for determining centration data for a pair of spectacles, comprising a computer-driven recording unit, which takes electronic images and which is disposed behind a splitter element, and comprising a fixation device. The fixation device generates at least one speckle pattern. The structural properties of the fixation device ensure that the subject's gaze is oriented in a predetermined direction. The speckles can be superposed with different patterns, e.g., a cross-shaped pattern. The disclosure also relates to a method for ascertaining centration data. The method and apparatus according to the disclosure allow the measurement from a short distance of relative centration data in the case of habitual posture for test subjects with very different visual acuity.

DE 10 2008 012 268 A1 discloses an apparatus and a method for a three-dimensional presentation of representation image data, in particular for positioning a subject, comprising at least one image recording device designed to generate image data of at least a portion of a head of a subject, at least one image representation device designed to present representation image data in three dimensions in such a way that a fixation target is presented in three dimensions and/or a portion of the head of the subject is illuminated and/or information data is presented in three dimensions, and at least one data processing device designed to determine parameter data of the subject by means of the image data.

DE 10 2016 004 430 A1 discloses a method for determining optical parameters of a subject and a computer program product for performing the method. The method includes the steps of: generating image data of at least portions of a system of the head of the subject and a spectacle frame disposed thereon in the use position; and iteratively determining the optical parameters by evaluating the image data generated, wherein the evaluation of the image data generated comprises computer-assisted automated image processing for the image data and execution of a multiplicity of specified manual image selection steps, the number of which can be set by a user of the video centration system, and wherein the number of iteration steps executed in the iterative determination of the optical parameters depends on the number of manual image selection steps executed by the user.

DE 10 2016 113 374 B3 discloses a method for determining a far visual point on a spectacle lens that is receivable in a spectacle frame with a frame plane, in which an image, lying in an image plane, of at least one section of a spectacle frame worn by a subject is captured by a camera with an optical axis while the subject gazes into the camera with a visual direction of at least one eye that passes through the frame plane, in which a pantoscopic angle of the spectacle frame related to the position of the image plane is ascertained, the pantoscopic angle being corrected to form a pantoscopic angle related to the vertical direction in accordance with the captured tilt angle of the image plane in relation to the vertical direction, in which a head rotation angle of the head of the subject, formed by the optical axis of the camera with a plane perpendicular to the distance line between the pupils of the eyes of the subject, is ascertained, in which the head rotation angle is corrected to a corrected head rotation angle corresponding to a horizontal alignment of the optical axis of the camera in accordance with the captured tilt angle of the image plane in relation to the vertical direction, in which the far visual point is determined by analyzing the image lying in the image plane while taking account of the corrected head rotation angle that corresponds to a horizontal alignment of the optical axis of the camera and in which the point of intersection of the viewing direction with the frame plane is determined by means of an image evaluation.

EP 3 422 087 A1 discloses methods and devices for correcting centration parameters and/or an axis position of a spherocylindrical refraction on the basis of a habitual head posture. A representation of the head is shown on a display, thereby permitting intuitive adjustment of a habitual head posture.

EP 3 425 446 A1 discloses a method for virtual adaptation of a pair of spectacle lenses, and a corresponding computer program and a computing device. Here, first measurement points are defined on a 3D model of a head of a person, and a model of a spectacle frame is adapted on the basis of the first measurement points. According to the disclosure, defining the first measurement points comprises defining second measurement points on a parametric head model, adapting the parametric head model to the 3D model of the head of the person and determining the first measurement points on the basis of the second measurement points and the adaptation. In this way, the second measurement points only need to be defined once on the parametric head model in order to be able to define the first measurement points for a multiplicity of different 3D models of different heads.

US 2010/0128220 A1 discloses a method and an apparatus for measuring the position of remarkable points in the eye of a user. Here, the method comprises a method step of recording images in different relative positions of the user in order to ascertain reference points of the eye therewith and determine the remarkable point as a function of the images. The values of the posture parameters are obtained by means of a position-determining element, which has at least one known geometric manifestation, which is fastened to the head of the wearer. Each of the recorded images comprises an illustration of the position-determining element. The posture parameter is ascertained as a function of the recorded images and the known geometric manifestation.

US 2014/0253875 A1 discloses a method for determining ocular and optical measurements for producing and adapting corrective spectacle lenses for a wearer by means of a camera. The method uses a protocol to reconstruct the eye system in three dimensions by modeling the eye system to provide accurate ocular and optical measurements. The method uses test objects which are connected or not connected to the face of the wearer.

SUMMARY

Against the background of the DIN EN ISO 13666:2013-10 standard, in particular, it is an object of the present disclosure to provide a storage medium-stored data record for use in a method for producing a spectacle lens, a method and a computer program for generating the data record, and a method for producing the spectacle lens, which at least partly overcome the aforementioned disadvantages and restrictions of the related art.

In particular, the data record and the present disclosure should facilitate the production of the spectacle lens already being possible after a single capture of a data record for adapting the spectacle lenses to the wearer of the pair of spectacles and to the spectacle frame selected by the wearer. As a result, a different spectacle lens to the spectacle lens originally selected by the wearer can be used for the pair of spectacles without a further data record having to be carried out for the aforementioned adaptation for the user.

This object is achieved by a data medium-stored data record for use in a method for producing a spectacle lens, a method and a computer program for generating the data record, and a method for producing the spectacle lens, wherein the data record contains additional information, which relates to at least one correction of the data values. Typical configurations, which can be realized individually or in combination, are presented below.

Hereinafter the terms "exhibit," "have," "comprise," or "include" or any grammatical deviations thereof are used in a non-exclusive way. Accordingly, these terms can refer either to situations in which, besides the feature introduced by these terms, no further features are present, or to situations in which one or more further features are present. For example, the expression "A exhibits B," "A has B," "A comprises B," or "A includes B" can refer both to the situation in which no further element aside from B is provided in A, that is to say to a situation in which A consists exclusively of B, and to the situation in which, in addition to B, one or more further elements are provided in A, for example element C, elements C and D, or even further elements.

In a first aspect, the present disclosure relates to a storage medium-stored data record for use in a method for producing a spectacle lens. The data record used in a method for producing a spectacle lens comprises at least the following data values:

spatial coordinates of a reference point at each eye of the wearer;

at least one spatial direction vector for specifying at least one viewing direction of the wearer through the spectacle lens; and a spatial rim curve or edge curve.

The data record which at least comprises the data values of:

spatial coordinates of a reference point at each eye of the wearer;

at least one spatial direction vector for specifying at least one viewing direction of the wearer through the spectacle lens; and a spatial rim curve or edge curve, is also referred to as "generic data record" below, wherein the data values of the generic data record are referred, individually or together, as "generic centration data."

Hence, the data record comprising the generic centration data relates, in particular, to the wearer of the spectacle lens and the spectacle frame selected by the wearer, wherein the spectacle lens is provided for introduction into a spectacle frame selected by the wearer of the pair of spectacles or as a rim-less spectacle lens. In the context of the present disclosure, the phrase "a pair of spectacles" denotes any element which comprises two individual spectacle lenses and a spectacle frame, the spectacle lens being provided for insertion into a spectacle frame that is selected by a wearer of the glasses. Alternatively, the lens can be used as a rimless spectacle lens. In the context of the present disclosure, a "spectacle lens" is understood to mean an optical lens which, pursuant to DIN EN ISO 13666:2013-10, is intended to measure and/or correct refractive errors and/or to protect the eye or to change the appearance of a wearer, the optical lens being worn in front of the wearer's eye but not in contact with the eye. Here, a spectacle lens can be assigned to one or more "lens types," selected from a single-vision spectacle lens, a multi-focal spectacle lens, in particular a bifocal spectacle lens or a trifocal spectacle lens, a progressive spectacle lens or a degressive spectacle lens. However, other lens types of spectacle lenses are conceivable. The spectacle lens can typically have an optically transparent material, selected from, in particular, glass or a transparent organic plastic, in each case with a different selectable refractive index. Instead of the term "wearer" used here, one of the terms "subject," "spectacle wearer," "user," or "subject" can also be used synonymously.

The "spectacle frame" is configured to securely hold the two spectacle lenses. To this end, the spectacle frame can comprise a spectacle frame rim, usually referred to as "rim," which, on the right and left side, respectively has a receptacle for in each case one of the two spectacle lenses. Typically, the rim can have a transparent or non-transparent material, in particular a firm but flexible and light material. Here, the distinction can be made between "full rim spectacles," which have a spectacle frame rim in each case surrounding both spectacle lenses, "half rim spectacles," in which the two spectacle lenses only partly adjoin a holder, and "rimless spectacles," in which the spectacle lenses each have a bore for receiving a holder. Moreover, further components can be provided, in particular at least one temple for wearing the pair of spectacles on an ear and/or at least one pad on a nose of a wearer of the pair of spectacles. A total of the spectacle frame, the temple and optionally available pads can also be referred to as a "frame."

In the case of full rim spectacles, each receptacle for the spectacle lenses is closed and can consequently typically have a groove running around the inside of the spectacle frame rim. In this case, the spectacle frame thus has an "inner contour," which denotes a profile of a shape encircling the inside of the spectacle frame rim. In this way, a spatial profile of at least one part of the spectacle frame that is configured to receive the spectacle lenses can be specified via a so-called "rim curve" or "edge curve." The rim curve or edge curve in this case typically comprises a multiplicity of data points, wherein the multiplicity of data points can also be referred to as a "point cloud." Here, each data point of the rim curve or edge curve comprises an edge value of the spectacle frame captured by measurement, wherein the "edge value of the spectacle frame" specifies a spatial coordinate relating to the inner contour of the spectacle frame, in particular the circumferential groove in the interior of the spectacle frame rim. In particular, each data point of the rim curve or edge curve can relate to a selected section of the inner contour in this case, for example to a set angular range, typically 0.25° to 10°, particularly typically 0.5° to 2.5°, in particular 1° to 2° of the inner contour of the spectacle frame. Consequently, the rim curve or edge curve can have 10 to 1550, typically 30 to 1500, typically 36 to 1440, more typically 144 to 720 and in particular 180 to 360 data points. However, other ways of setting the data points of the rim curve or edge curve are possible, for example setting in random or stochastic fashion, or an instance of setting in which more data points relate to labeled points on the rim curve or edge curve, for instance to regions of the spectacle frame rim with an increased curvature in comparison with the entire spectacle frame rim.

As an alternative to the aforementioned definition of the rim curve or edge curve, the present disclosure also understands the representation of the margin or carrier described in the standard, section 13.4.

As a further alternative to the aforementioned definitions of the rim curve or edge curve, the present disclosure also understands the representation of the edge of the spectacle lens as a data record, from which the three-dimensional profile of the edge of the spectacle lens facing away from the spectacle wearer can be uniquely determined, where necessary on the basis of additional quantities describing the spectacle lens. The representation of the edge of the spectacle lens can be, e.g., the area surrounded by the projection of the edge of the spectacle lens in the image plane of an image sensor of an image capture device, into which area the spectacle lens is imaged for the image capture. In the case of full rim spectacles, the edge of a spectacle lens corresponds, in this case, to a spectacle frame inner edge. In the case of half rim spectacles, the edge of a spectacle lens in this case is understood to mean, firstly, the edge of a spectacle lens corresponding to the spectacle frame inner edge and, secondly, the lens outer edge not surrounded by the spectacle frame. For a rimless pair of spectacles, the edge of a spectacle lens is the lens outer edge in this case.

Typically, the rim curve or edge curve is the shape-determining boundary of the spectacle lens located on the front surface of the spectacle frame distant from the face, and it partly or wholly coincides with the inner edge of the spectacle frame lying on the front in the case of half rim or full rim spectacles. In the case of full rim spectacles, the rim curve or edge curve on the front surface of the spectacle frame distant from the face is the same as the lens outer edge located on the front side or the frame inner edge located on the front side. In the case of half rim spectacles, the rim curve or edge curve on the front surface of the spectacle frame distant from the face is the same as the lens outer edge located on the front side or the frame inner edge located on the front side, provided there is a structure provided by the frame. To the extent that there is no structure provided by the frame in the case of half rimmed spectacles, the edge curve is the same as the lens outer edge located on the front side in the front surface of the spectacle frame distant from the face. In the case of rimless spectacles, there is no analogous structure of the frame, i.e., the term edge curve here always denotes the lens outer edge located on the front side in the front surface of the spectacle frame distant from the face. Consequently, the term "edge curve" can be used synonymously for the two terms of "lens outer edge" and "frame inner edge" below, depending on whether the term is used in the context of the spectacle lens or in the context of the frame.

The edge of a spectacle lens can be determined, for example, by means of the method described in D. Borza et al., Eyeglasses Lens Contour Extraction from Facial Images Using an Efficient Shape Description, Sensors (2013), vol. 13, pp. 13638-13658, in which the set of points of the picture elements located on the edge of the spectacle lenses are modeled as a superposition of mathematical functions on the basis of Fourier descriptors. These mathematical functions describe different edge shapes. The functions used for the modelling of the edge of spectacle lenses are stochastic, i.e., selected at random from a finite set of possible functions. The model for the edge of the spectacle lenses described on the basis of the selected functions is then compared to an edge of the spectacle lens ascertained in an edge detection method and evaluated.

By way of example, the edge of a spectacle lens can also be determined by ascertaining the contour of the edge of the spectacle lenses in a digital image of a spectacle wearer by resorting to a spectacle lens-specific tracer data record containing the profile of the edge, as described in DE 10 2011 115 239 A1.

The edge of a spectacle lens can also be determined, for example, by the computer-implemented method for ascertaining the representation of the edge of a spectacle lens described in WO 2018/137863 A1. This method comprises the provision of image data relating to the spectacle wearer with a worn spectacle frame and the calculation of information data derived from the image data.

Particularly in the case of half rim spectacles or rimless spectacles, however, a dummy lens can be inserted into the spectacle frame or between the nose piece and the temple. The term "dummy lens" relates to any element made of a slightly curved, optically transparent material, in particular selected from glass or a transparent organic plastic with no optical effect, which is configured to serve as a template for the contour of a spectacle lens. Pursuant to ISO 8624:2011, a dummy lens or a demonstration lens is a spectacle lens used for demonstration purposes in the spectacle frame without dioptric power. The dummy lens, which is generally in the form of a slightly curved lens, thus has an outer contour, which denotes the profile of the circumferential form of the dummy lens on the side of the lens and which is also referred to as a "lens edge" or "lens edge frame." Consequently, in the present case of half rim spectacles or rimless spectacles, the data points of the rim curve or edge curve can typically be selected from edge values, captured by measurement, of the lens edge, the frame of the lens edge or provided three-dimensional design data of the frame of the lens edge. "Captured by measurement" either means mechanical probing of the edge by a tracer, which probes either the positive form of the dummy lens or spectacle lens or the negative form of the frame groove, or an optical approach, which ascertains the three-dimensional profile of the outer lens edge or of the inner frame rim from stereoscopic image recordings or laser-assisted methods with line projections. For further details in this respect, reference can be made to the above description with respect to full rim spectacles.

The term "data record," the generic centration data, in this case denotes a plurality of data values which, as explained in more detail below, may be based on measured values captured by measurement and/or on available data, in particular three-dimensional design data of the frame of the lens edge, and which are related in terms of content by virtue of relating to the wearer and the spectacle frame. According to the disclosure, the data record, the generic centration data, comprise at least the following data values:

the spatial coordinates of a reference point at each eye of the wearer;
the at least one spatial direction vector for specifying the at least one viewing direction of the wearer through the spectacle lens; and
the spatial rim curve or edge curve.

In a particularly typical configuration of the present disclosure, the data record, the generic centration data, may moreover comprise additional information or may be complemented by the latter, the additional information relating to one or more corrections of the specified data values, in particular in relation to the wearer, the spectacle frame or the spectacle lens. Here, the additional information can be incorporated in the specified data record as at least one further data value. As an alternative or in addition thereto, the additional information can be included in at least one data value of the data record already available. Particularly typical correction values within the scope of the present disclosure are:

a spatial change in a head posture of the wearer, in particular the change
  in a habitual head posture, i.e., a correction of a forward tilt of the head of the wearer;
  in a rotation of the head of the wearer; and/or
  a lateral tilt of the head of the wearer when the image is recorded, in particular defined by the angle of the frame horizontal in relation to the horizontal plane in space;
a change in a vertical coordinate of at least one visual point, in particular a displacement of a stamp image parallel to the vertical direction in the frame plane of the spectacle frame;
a change in the spatial direction vector for specifying the at least one viewing direction of the wearer through the spectacle lens relative to the viewing direction adopted by the wearer when recording the viewing direction, in particular a change of the viewing direction away from the principal viewing direction to infinity and toward an activity-related, most frequent viewing direction.

In the context of the present disclosure, the term "spatial" denotes data values which are distributed over three-dimensional space and which are therefore not restricted to a plane. According to the disclosure, the rim curve or edge curve is available in the form of a spatial curve, i.e., the multiplicity of data points of the rim curve or edge curve extend in the form of edge values of the spectacle frame, of the lens edge or of the lens rim over three-dimensional space, and so three mutually independent values are required to completely describe each data value. Here, the three mutually independent values can typically be specified in a spatial coordinate system, typically a Cartesian coordinate system in which the coordinates x, y and z are perpendicular to one another. Other configurations or other coordinate systems, in particular a cylindrical coordinate system, are likewise possible. Hence, the rim curve or the edge curve generally is located neither in a lens plane nor in a frame plane in particular, as respectively defined in the DIN EN ISO 1366:2013-10 standard.

According to the disclosure, the reference point at each eye of the wearer can be specified as a position in the form of three mutually independent values in the chosen spatial coordinate system. Here, the term "position" denotes a relative position of the reference point in space. The term "reference point" denotes a uniquely determinable point on the eye of the user, which is typically connected to the at least one viewing direction of the wearer through the spectacle lens, typically as spatial initial point of the spatial direction vector for specifying the spatial position of the direction vector. Here, the reference point for each of the two eyes can particularly typically be selected from a group comprising a pupil center, a pupillary reflex, a corneal apex and a center of rotation of the eye. Here, the data value for the position of each of the two reference points of the wearer can typically be determined by means of image processing. To this end, the pupil center, the pupillary reflex and/or the corneal apex can particularly typically be ascertained from at least two recordings of the wearer in each case, in which at least one of the pupils or the corneal apex is identifiable. To this end, as described in more detail below, use can be made of the at least one frontal recording of the wearer and the respective at least one lateral recording of the wearer. Here, the "pupil" denotes an entry opening that is present in each eye, through which radiation in the form of light can enter into the interior of the eye. A person skilled in the art can ascertain the center of rotation of the eye in a manner known per se.

In the reverse direction, the pupil can be considered an exit opening, through which a viewing direction of the wearer can be set from the eye and through the spectacle lens into the surroundings. For the purposes of specifying a viewing direction of the wearer, a spatial initial point or reference point in the form of three mutually independent values is specified according to the disclosure in addition to the spatial direction vector. In the Cartesian or cylindrical coordinate system, the viewing direction can be identified, for example, with the direction of the z-coordinate while the other two coordinates are perpendicular thereto. However, different ways of specifying the spatial direction vector for the viewing direction are possible. Here, the term "viewing direction" denotes a spatial direction through which the wearer of the pair of spectacles gazes through the spectacle lens. Here, as is conventional, use can typically made of a so-called "main fixation direction," which is set as the viewing direction in the horizontal direction through the spectacle lens, straight-ahead to a visual target situated at infinity. What is particularly typical here is that the viewing directions of both eyes extend parallel to one another. In the case where the viewing directions of both eyes do not extend parallel to one another, the respective viewing direction of each eye can be captured separately. This can be distinguished in each case from an activity-specific viewing direction of the wearer, in particular, the wearer only adopting the latter when undertaking at least one selected activity. Moreover, at least two principal viewing directions can be specified for each eye of the user in the case of multi-focal spectacle lenses or progressive spectacle lenses, for example for gazing into the distance ("distant viewing direction"), gazing nearby ("near viewing direction") and optionally for gazing into a range lying therebetween. In a typical configuration, the viewing directions of the wearer and, if applicable, the one or more further viewing directions, e.g., the activity-specific viewing directions, can be determined by measurement, typically by means of the methods and apparatuses presented in WO 2005/069063 A1.

According to the disclosure, respectively the same spatial coordinate system is used for all data values of the data record, i.e., for all data values of the generic centration data, which are used in the method for producing the spectacle lens, i.e., for the spatial coordinates of the reference points at each eye of the wearer, for the at least one spatial direction vector for specifying a viewing direction of the user through the spectacle lens and for the spatial rim curve or edge curve, in particular of the spectacle frame, of the lens edge or the lens edge frame. In this way, the position of the reference point at each eye of the user, the viewing direction of the user through the spectacle lens and the rim curve or frame curve, in particular of the spectacle frame, of the lens edge of the lens edge frame, are fixedly related to one another within the chosen spatial coordinate system. In a particularly typical configuration of the present disclosure, the same spatial coordinate system is respectively used for all data values of the data record of the generic centration data, and so all data values of the data record of the generic centration data are specified in relation to the same spatial coordinate system. In this typical configuration of the present disclosure, the data record of the generic centration data can consequently be created without iterations, i.e., a one-time determination of the data values of the data record can typically suffice for the latter to be usable in a method for producing the spectacle lens.

In the case of conventional appliances or methods for determining the conventional centration data, which operate with successively created frontal image and lateral image, the centration data are calculated from respectively one frontal and lateral image of the subject. By way of example, at least the vertex distance HSA and the pantoscopic angle FSW are calculated from the lateral image in the case of the i.Terminal 2 centration appliance by Carl Zeiss Vision GmbH; other data, such as the lens length (actually: width) a and the lens height b and the interpupillary distance PD are calculated from the frontal image. However, results of the calculations from the frontal image (e.g., the lens length a) are required when calculating the data of the lateral image (HSA, FSW); conversely, results of the calculations from the lateral image (e.g., the HSA) are required when calculating data from the frontal image (PD). Ideally, the numerical values are determined iteratively: in the first step, the best possible estimates for the unknown parameters are used to calculate values from the lateral image. These are then used for the calculations from the frontal image. Using this, the calculation in the lateral image can be repeated, etc. This iteration allows the accuracy of the numerical values of the conventional centration data to be improved.

The generic centration data can typically be calculated in one step from at least two simultaneously captured images of the head of a spectacle wearer, which are typically calibrated to one another, with an anatomically adapted and worn spectacle frame or from the corresponding two-dimensional rendered recordings of the avatar of the head of a wearer with a virtually adapted and virtually worn spectacle frame. The at least two simultaneously captured images are typically recorded from at least two directions of view. Further typically, the at least two simultaneously recorded images are at least one frontal image and at least one lateral image of the head of a spectacle wearer with anatomically adapted and worn spectacle frame or from the corresponding two-dimensional rendered recordings of the avatar of the head of a spectacle wearer with virtually adapted and virtually worn spectacle frame. Further typically, the generic centration data can also be determined from a three-dimensional virtual model of the head with a virtually adapted and virtually worn spectacle frame.

The calculations required for the generic centration data are typically, in the entirety thereof, calculated from the at least two simultaneously captured images of the head of a spectacle wearer, which are typically calibrated to one another, with an anatomically adapted and worn spectacle frame or from the corresponding two-dimensional rendered recordings of the avatar of the head of a spectacle wearer with a virtually adapted and virtually worn spectacle frame, or taken from the corresponding three-dimensional virtual model of the head with a virtually adapted and virtually worn spectacle frame. The calculation requires no iteration to obtain the best possible accuracy. Taking relates to selecting data points of the three-dimensional virtual model of the head with virtually adapted and virtually worn spectacle frame. In particular, at least two data points representing the eyes are taken from the virtual model of the head and at least the data points representing the rim curve or edge curve are taken from the three-dimensional model of the virtually adapted and virtually worn spectacle frame.

Additional simplifications are made in conventional appliances, for example the i.Terminal 2 centration appliance by Carl Zeiss Vision GmbH, also prompted by the corresponding definitions in the standard. In particular, the spectacle lenses are replaced by a lens plane; in the process, information about the volume-type extent thereof is lost and the usually curved form is replaced by a flat surface. How well the determination of the HSA corresponds to reality depends not only on the question of where this lens plane is set in relation to the actual spectacle lens but also on the question of the optical power thereof. This is directly linked to the property of the "center thickness," which directly influences the HSA, particularly in the case of spectacle lenses with a positive dioptric power. A further simplification lines in the frame plane: it should serve as a replacement object for the spectacle frame, i.e., the front part of a pair of spectacles without temples. By way of example, the pantoscopic angle is measured relative to its position in space and the face form angle is defined therebetween and the lens planes. The further a finished spectacle lens extends around the eye to the temple, the more the angle between the viewing direction and the lens plane deviates from the angle between the viewing direction and the front/back lens surface; the numerical value for the face form angle then only still has a limited meaning.

Depending on the selected lens type, the front and back surface of the spectacle lens are optimized before the spectacle lens is manufactured, to be precise taking account of the individually determined correction values of the subjective refraction and the position of the spectacle lens in front of the respective eye. The latter was taken into account when calculating the conventional centration data. Usually, there is a back calculation of a spatial arrangement of eyes and spectacle lenses from these conventional centration data before the actual optimization of the front and back surface can take place in three-dimensional space. This calculation is subject to errors due to the aforementioned omissions. Only if the generic centration data and the correction values are transmitted to a spectacle lens producer instead of the conventional centration data when the spectacle lens is ordered is the detour via the error-afflicted conventional centration data omitted. The front and back surface can be optimized directly on the basis of the exactly known generic centration data and, optionally, on the basis of the correction values. Consequently, the spectacle lens produced taking account of the generic centration data is adapted to the best possible extent to the individual correction requirements of the spectacle wearer.

Should knowledge of these conventional centration data nevertheless be necessary throughout the course of the entire process, starting with the recording of the images of the spectacle wearer and down to the insertion of the spectacle lenses into the frame, for instance for plausibility checks by an optician, a conventional centration data record can be determined at any point in the entire process from the generic centration data, the optionally undertaken corrections and the lens type. The conventional centration data record need not be stored; it can be immediately discarded and regenerated at any time if necessary. Not least, this also allows the lens type to be replaced by any other type at any time should the customer's request or other boundary conditions make this necessary.

From the specified data values of the generic centration data and typically from the correction values, a so-called "visual point" can thus be determined unambiguously and reproducibly as the point of intersection of the viewing direction of the wearer with an eye-side back surface of the spectacle lens. Should there be at least two viewing directions, it is consequently possible to specify a visual point for each of the at least two viewing directions. The data record of the generic centration data proposed according to the disclosure, which comprises at least the aforementioned data values, is independent of the lens type and the centration prescription determined thereby. Hence, the at least one visual point can be used, in particular, to determine conventional centration data at all times, taking account of the chosen lens type. Consequently, the term "conventional centration data" denotes a further set of centration values ascertained from the data record of the generic centration data, which are used to produce the spectacle lenses from a spectacle lens blank, taking account the wearer of the pair of spectacles and the spectacle frame selected by the wearer. By way of example, if the distance viewing direction and a near viewing direction serve as the two viewing directions in a progressive addition lens, the respectively associated visual points through the progressive addition lens describe the distance centration point or the distance visual point pursuant to the standard, section 5.16, and the near centration point or the near visual point pursuant to the standard, section 5.17. Any other arrangement of at least two different viewing directions is conceivable, however. The further set of centration values used to produce the spectacle lenses from a spectacle lens blank, taking into account the spectacle wearer and the spectacle frame selected by the spectacle wearer, typically at least comprise:

the face form angle, the angle between the frame plane and the right or left lens plane, pursuant to the standard, section 17.3, and/or the coordinates of the centration point, i.e., the absolute value of the distance of the centration point from the nasal vertical side or from the lower horizontal side of the boxed system, measured in the lens plane, pursuant to the standard, section 17.4, and/or the corneal vertex, i.e., the distance between the back surface of the spectacle lens and the apex of the cornea measured in the viewing direction perpendicular to the frame plane, pursuant to the standard, section 5.27, and/or the "as-worn" pantoscopic angle or pantoscopic angle, i.e., the angle in the vertical plane between the normal with respect to the front surface of a spectacle lens at the center thereof according to the boxed system and the fixation line of the eye in the primary position, which is usually assumed as horizontal, pursuant to the standard, section 5.18, and/or the far visual point, i.e., the assumed position of the visual point on a spectacle lens for distance vision under given conditions, pursuant to the standard, and/or optionally the near visual point, i.e., the assumed position of the visual point on a spectacle lens for near vision under given conditions, pursuant to the standard, section 5.17.

According to the disclosure, the specification of the data values comprised by the proposed data record of the generic centration data is sufficient to be able to produce the spectacle lenses, even in the case where a change in the lens selection should occur after the data record has been generated. Typically, the conventional centration data can be obtained independently in time of the determination of the data values from the proposed data record. In particular, this can be implemented by the optician when they clamp into a grinding apparatus a round lens blank or an uncut spectacle lens, i.e., a spectacle lens with two finished optical surfaces before the edging pursuant to the standard, paragraph 8.4.7, in order to process the edge of the spectacle lens in accordance with the rim curve or the edge curve and, optionally, the groove profile corresponding to the profile of the rim. Here, the groove profile is understood to mean the cross-section of the contact surface between the spectacle lens and the spectacle frame of a pair of full rim spectacles.

In a particularly typical configuration, the data values of the data record of the generic centration data proposed herein can therefore be used to obtain at least one, typically all, of the following centration values conventionally used in the production of the spectacle lens:

distance between the corneal apex of the respective eye and the visual point of a viewing direction through the spectacle lens;

distances x between the visual points and the straight line through the innermost points of the rim curves or edge curves pursuant to the standard, FIG. 12;

distances y between the visual points and the straight line through the lowermost points of the rim curves or edge curves pursuant to the standard, FIG. 12;

lens length a and lens height b of a boxed system pursuant to the standard, FIG. 12;

horizontal distances u between the visual points and the vertical centerlines of the boxed system pursuant to the standard, FIG. 12;

vertical distances v between the visual points and the horizontal centerlines of the boxed system pursuant to the standard, FIG. 12;

the distances between the corneal apex of the respective eye and the lens surface, facing the respective eye, of the standard, as per FIG. 12, angles α between the lens planes, which are each set as a plane of the relevant spectacle lens, and the frame plane (FSW) pursuant to the standard, FIG. 11; and angle through which the frame plane is tilted forward from the perpendicular (pantoscopic angle).

In a further, particularly typical configuration, the data values of the data record of the generic centration data proposed herein can be used directly, i.e., without processing further intermediate steps, for optimizing the front and back surface of the spectacle lens, i.e., the lens equation.

Moreover, visual points deviating from the far visual point can be taken into account in accordance with the respective centration prescription to be applied; to this end, the spatial direction vector of the viewing direction can be rotated through an angle fitting to the centration prescription in order to determine the visual point of the new viewing direction through the eye-side back surface of the spectacle lens proceeding from a center of rotation of the eye. Furthermore, an optionally determined near viewing direction can be used to adapt a corridor length of a progressive power lens to the wearing situation. Other corrections, particularly in relation to a habit, a head rotation or a lateral tilt of the head of the wearer or in relation to a displacement of a stamp image in spectacle lenses that have a separate distance zone and a near zone can be taken into account in analogous fashion. Reference is made to the standard in respect of definitions and observations to points comprised by the conventional centration data.

In a typical configuration, a lateral tilt of the head of the wearer can be derived from the following quantities:

from an angle of a frame horizontal with respect to a spatial horizontal;

from a lateral tilt of the head of a virtual model of a section of the user, in particular of the head (avatar);

from a relative height of the eyes of the wearer or of the avatar; and/or from a frame horizontal of an spectacle frame virtually put on the avatar or from a view of the spectacle frame superimposed on the image of the wearer.

Here, the lateral tilt of the head can be considered to be a correction parameter for an axis position of the spectacle lens and can be included as a further point in the generic centration data. Additionally, further correction parameters can be used before calculating the conventional centration data, typically a change in the forward tilt, a head rotation, a y-displacement, i.e., a vertical displacement of the stamp image, and/or change in viewing direction.

In a further aspect, the present disclosure relates to a method for generating a data record of generic centration data, which are used in a method for producing a spectacle lens. The method generates a data record which is used in the method for producing the spectacle lens, wherein the data record comprises at least the following data values:

spatial coordinates of a reference point at each eye of the wearer;

at least one spatial direction vector for specifying at least one viewing direction of the wearer through the spectacle lens; and a spatial rim curve or edge curve, wherein each of the data values is generated from values captured by measurement or from available data.

As already mentioned above, the reference point for each of the two eyes can particularly typically be selected in this case from a group comprising a pupil center, a pupillary reflex, a corneal apex and a center of rotation of the eye. Here, the data value for the position of each of the two reference points of the wearer can typically be determined by means of image processing. To this end, the pupil center, the pupillary reflex and/or the corneal apex can particularly typically be ascertained from at least two recordings of the wearer in each case, in which at least one of the pupils or the corneal apex is identifiable. To this end, is described in more detail below, use can be made of the at least one frontal recording of the wearer and the respective at least one lateral recording of the wearer.

As furthermore already mentioned above, the viewing directions of the wearer through the spectacle lens can typically be determined by measurement, in particular by means of the methods and apparatuses presented in WO 2005/069063 A1. The method described therein for ascertaining centration data for a pair of spectacles comprises the generation of a speckle pattern as a fusion stimulus for a spectacle wearer and the recording of an image of at least the eye region of a spectacle wearer including the spectacle frame. Subsequently, the centration data are determined on the basis of this image recording using mathematical methods. The apparatus described herein comprises a fixation device that generates a speckle pattern.

In a typical configuration, the data points of the rim curve or the edge curve can be captured by measurement, to be precise typically be determined by means of image processing from a single frontal recording of the user and, typically, in each case from at least one lateral recording of the user from both sides, implemented simultaneously therewith, provided that the user wears the spectacle frame during the specified recordings. As an alternative or in addition thereto, the data points of the rim curve or edge curve could be selected from design data of the spectacle frame, to the extent that these are available as a spatial model. Here, the design data of the spectacle frame can be provided, for example, directly from model data of the producer of the spectacle frame, for example from CAD data, or, can be captured in an optical measurement laboratory by measurement by means of an optical recording unit, typically probed by means of a tracer or recorded by means of a scanner, typically an optical scanner, in particular before the spectacle lenses are adapted to the spectacle frame selected by the wearer.

In a further aspect, the present disclosure relates to a computer program for generating a data record used in a method for producing a spectacle lens, wherein the computer program is configured to generate the data record of the generic centration data, wherein the data record comprises at least the following data values:

spatial coordinates of a reference point at each eye of the wearer;

at least one spatial direction vector for specifying at least one viewing direction of the wearer through the spectacle lens; and a spatial rim curve or edge curve, wherein each of the data values is generated from values captured by measurement or from available data.

In a further aspect, the present disclosure relates to a computer-readable storage medium, on which a data record used in a method for producing a spectacle lens is stored, wherein the data record comprises at least the following data values:
- spatial coordinates of a reference point at each eye of the wearer;
- at least one spatial direction vector for specifying at least one viewing direction of the wearer through the spectacle lens; and
- a spatial rim curve or edge curve.

In a further aspect, the present disclosure relates to a method for producing a spectacle lens, wherein the spectacle lens is produced by processing a spectacle lens blank, wherein the spectacle lens blank is processed on the basis of conventional centration data, wherein the conventional centration data are ascertained from a data record of the generic centration data, wherein the data record of the generic centration data comprises at least the following data values:
- spatial coordinates of a reference point at each eye of the wearer;
- at least one spatial direction vector for specifying at least one viewing direction of the wearer through the spectacle lens; and
- a spatial rim curve or edge curve of the spectacle frame or a lens edge frame.

Here, a spectacle lens blank can typically be processed by means of a processing device, in particular mechanical processing device, wherein the conventional centration data are used to drive the processing device. In addition to the data values, the specification of a lens type can also be used to ascertain the centration data, wherein the lens type relates to the spectacle lens selected by the wearer. For further details, reference is made to the illustration of the exemplary embodiment in relation to FIG. 2.

For definitions and optional configurations of the method and of the computer program for generating a data record, which are used in a method for producing a spectacle lens, of the computer-readable storage medium and of the method for producing a spectacle lens, reference is made to the description of the data record for use in a method for producing a spectacle lens, as provided above or below.

The data record of the generic centration data according to the disclosure and the associated methods and the computer program have numerous advantages over conventional data records of conventional centration data and the associated methods and computer programs. In particular, it is already possible therewith to produce a spectacle lens after a single capture of a data record for adapting the spectacle lenses to the wearer of the pair of spectacles and to the spectacle frame selected by the wearer. As a result, a different spectacle lens, i.e., a different lens type, to the spectacle lens originally selected by the wearer can subsequently be used for the spectacle lens without a further data record for this adaptation having to be carried out for the wearer. By way of example, instead of an originally selected progressive addition lens pursuant to the standard, section 8.3.5, a bifocal lens pursuant to the standard, section 14.1.26, can be used on the basis of the data record captured once. It is also possible to subsequently perform any desired corrections without altering the other values of the data record, the corrections being concerned with
- changing the lateral tilt, forward tilt or rotational angle of the head and/or
- manipulating the height of the centration points and/or
- adapting the viewing directions to certain visual tasks.

When conventional centration data are used, each change in these aforementioned arbitrary corrections, i.e., the change in the lateral tilt, the forward tilt or the rotational angle of the head, the manipulation of the height of the centration points, the adaptation of the viewing directions to certain visual tasks, and a change in the lens type would lead to altered values for the conventional centration data (face form angle, coordinates of the centration point, vertex distance, "as-worn" pantoscopic angle or pantoscopic angle, distance visual point, optionally the near visual point). The values of the conventional centration data altered by corrections allow no deductions to be made about the corrections performed. They can no longer be reconstructed either. Moreover, the values of the conventional centration data altered by the corrections do not provide exact conclusions about the originally captured generic centration data and the latter can no longer be exactly reconstructed therefrom either.

If generic centration data are used, the arbitrary corrections and/or the selection of the lens type can be made, and optionally altered again, afterwards at any time up to the start of the manufacturing process of the spectacle lens. By way of example, the arbitrary corrections and/or the selection of the lens type could be made after a one-time capture of a data record of the generic centration data should the optician determine that the head posture and the viewing direction for the principal visual task, for which the spectacle lens should be manufactured, differs from the head posture and viewing direction during the one-time capture of the data record of the generic centration data.

The one-time captured data record of the generic centration data can be used directly, together with the optionally undertaken arbitrary corrections as described above, for the optimization of the front and back surface of the spectacle lens. It is not necessary to create a three-dimensional arrangement of the spectacle lens to be manufactured and of a reference point of the respective eye from the conventional centration data in order then to calculate, and optionally optimize, the surfaces of the spectacle lens on the basis of this arrangement.

Furthermore, if the optician only has a few of the actually employable models of spectacle frames physically in stock, the desired spectacle frame can still present to the user after during a virtual wear following the generation of the avatar. The generic centration data could then be ascertained directly therefrom, and the spectacle frame with the spectacle lenses could be ordered in a single ordering process.

Consequently, a spectacle lens can be manufactured on the basis of the one-time captured data record of generic centration data, independently of whether this data record
- was determined at least two images of the wearer, recorded from different directions of view and calibrated to one another, with a worn and adapted spectacle frame, or
- was determined from at least two two-dimensional rendered recordings of the avatar of the head of a spectacle wearer from different directions of view, with a virtually worn and virtually adapted spectacle frame, or
- taken from a three-dimensional model of the head, with a virtually worn and virtually adapted spectacle frame.

In summary, within the scope of the present disclosure, the exemplary embodiments according to the following clauses are particularly typical:

Clause 1. A storage-medium stored data record for use in a method for producing a spectacle lens, wherein the data record comprises at least the following data values:

spatial coordinates of a reference point at each eye of the wearer;

at least one spatial direction vector for specifying at least one viewing direction of the wearer through the spectacle lens; and a spatial rim curve or edge curve.

Clause 2. The data record according to the preceding clause, wherein the spatial rim curve or edge curve relates to a spectacle frame or a lens edge frame.

Clause 3. The data record according to any one of the preceding clauses, wherein the edge curve
comprises a lens outer edge of a spectacle lens or of a dummy lens or
comprises a frame inner edge of a spectacle frame.

Clause 4. The data record according to any one of the preceding clauses, wherein all data values are specified in relation to the same spatial coordinate system.

Clause 5. The data record according to any one of the preceding clauses, wherein the data record is generated without iteration.

Clause 6. The method according to any one of the preceding clauses, wherein the reference point on the eye of the wearer is selected from: a pupil center, a pupillary reflex, a corneal apex or a center of rotation of the eye.

Clause 7. The method according to any one of the preceding clauses, wherein the at least one viewing direction of the wearer through the spectacle lens is selected from: a main fixation direction; a principal viewing direction; an activity-specific viewing direction of the wearer; in particular a reading-specific viewing direction of the wearer; a viewing direction of the wearer modified by correction values.

Clause 8. The method according to any one of the preceding clauses, wherein the rim curve or edge curve is available in the form of a multiplicity of data points, wherein the data points are selected from: edge values of the spectacle frame or of the lens edge frame captured by measurement, in particular by scanning by means of a tracer or from the recording by means of a scanner; design data of the spectacle frame or of the lens edge frame.

Clause 9. The data record according to any one of the preceding clauses, wherein the data record comprises additional information, wherein the additional information relates to at least one correction of the data values.

Clause 10. The data record according to the preceding clause, wherein the additional information is incorporated in the data record as at least one further data value.

Clause 11. The data record according to either of the two preceding clauses, wherein the additional information are included in at least one of the data values of the data record.

Clause 12. The data record according to any one of the four preceding clauses, wherein the correction of the data values comprises at least one of the following correction values:
a spatial change in the head posture of the wearer;
a change in a vertical coordinate of at least one visual point; or
a change in the spatial direction vector indicating the at least one viewing direction of the wearer through the spectacle lens relative to the viewing direction adopted by the wearer when recording the viewing direction.

Clause 13. The data record according to the preceding clause, wherein the spatial change in the head posture of the wearer comprises a change
in a habitual head posture, a correction of a forward tilt of the head of the wearer;
in a rotation of the head of the wearer; and/or
in a lateral tilt of the head of the wearer at the time of the image recording.

Clause 14. The data record according to one of the two preceding clauses, wherein the change in the vertical coordinate of the at least one visual point comprises a displacement of a stamp image parallel to the vertical direction of a frame plane of the spectacle frame.

Clause 15. A method for generating a data record used in a method for producing a spectacle lens, wherein the data record comprises at least the following data values:
spatial coordinates of a reference point at each eye of the wearer;
at least one spatial direction vector for specifying at least one viewing direction of the wearer through the spectacle lens; and
a spatial rim curve or edge curve,
wherein the data values are captured by measurement or provided from available data.

Clause 16. The method according to the preceding clause, wherein the spatial rim curve for edge curve relates to a spectacle frame or a lens edge frame.

Clause 17. The method according to either of the two preceding clauses, wherein each of the data values is captured by means of an optical measuring device.

Clause 18. The method according to the preceding clause, wherein the data values are captured by mechanical methods and used directly or combined by calculation with optically determined data and used subsequently.

Clause 19. The method according to the preceding clause, wherein at least a frontal recording of the wearer and, in each case, at least one lateral recording of the wearer are made simultaneously in relation to the viewing direction of the wearer while the wearer wears the spectacle frame.

Clause 20. The method according to the preceding clause, wherein a virtual model of a section of the wearer is created from the at least one frontal recording of the wearer and the respective at least one lateral recording of the wearer.

Clause 21. The method according to the preceding clause, wherein the section of the wearer comprises at least each eye of the wearer and a part of the wearer readied to wear the spectacle frame, wherein the spectacle frame is worn by the virtual model.

Clause 22. The method according to any one of the seven preceding clauses, wherein the reference point on the eye of the wearer is selected from: a pupil center, a pupillary reflex, a corneal apex or a center of rotation of the eye.

Clause 23. The method according to the preceding clause, when the pupil center, the pupillary reflex or the corneal apex is determined by evaluating the at least one frontal recording of the wearer and the respective at least one lateral recording of the wearer by means of image processing.

Clause 24. The method according to any one of the nine preceding clauses, wherein the at least one viewing direction of the wearer through the spectacle lens is selected from: a main fixation direction; a principal viewing direction; an activity-specific viewing direction of the wearer, in particular a reading-specific viewing direction of the wearer; a viewing direction of the wearer modified by correction values.

Clause 25. The method according to any one of the ten preceding clauses, wherein the rim curve or edge curve is provided in the form of a multiplicity of data points, wherein the data points are selected from: edge values of the spectacle frame or of the lens edge frame captured by measurement, in particular by scanning by means of a tracer or from a recording by means of a scanner; design data of the spectacle frame or of the lens edge frame.

Clause 26. A generic data record for use in a method for producing a spectacle lens, wherein the generic data record comprises at least the following data values:
- spatial coordinates of a reference point at each eye of the wearer;
- at least one spatial direction vector for specifying at least one viewing direction of the wearer through the spectacle lens; and
- a spatial rim curve or edge curve.

Clause 27. The generic data record according to the preceding clause, wherein the data values of the generic data record are generated in one step from at least two simultaneously captured images of the head of a wearer, which are typically calibrated to one another, with an anatomically adapted and worn spectacle frame or from the corresponding two-dimensional rendered recordings of an avatar of the head of the wearer with a virtually adapted and virtually worn spectacle frame.

Clause 28. The generic data record according to the preceding clause, wherein the at least two simultaneously captured images of the head of the wearer are calibrated with respect to one another.

Clause 29. The generic data record according to the two preceding clauses, wherein the at least two simultaneously captured images are recorded from at least two different directions of view.

Clause 30. The generic data record according to any one of the three preceding clauses, wherein the at least two simultaneously captured images comprise a frontal image and at least one lateral image of the head of the wearer with anatomically adapted and worn spectacle frame or a two-dimensional rendered recording of the avatar of the head of the wearer with a virtually adapted and virtually worn spectacle frame.

Clause 31. The generic data record according to any one of the preceding clauses 26 to 29, wherein the data values of the generic data record are generated from a three-dimensional virtual model of the head with virtually adapted and virtually worn spectacle frame.

Clause 32. The generic data record according to any one of the five preceding clauses, wherein, when data values of the generic data record are generated, these are, in the entirety thereof, calculated from the at least two simultaneously captured images of the head of the wearer with anatomically adapted and worn spectacle frame or calculated from the two-dimensional rendered recordings of the avatar of the head of the wearer with virtually adapted and virtually worn spectacle frame or taken from the three-dimensional virtual model of the head with virtually adapted and virtually worn spectacle frame.

Clause 33. The generic data record according to the preceding clause, wherein the data values of the generic data record are generated without iteration.

Clause 34. The generic data record according to either of the two preceding clauses, wherein generating the data values of the generic data record comprises selecting data points of the three-dimensional virtual model of the head of the wearer with virtually adapted and virtually worn spectacle frame.

Clause 35. The generic data record according to the preceding clause, wherein at least two data points representing the eyes are taken from the three-dimensional virtual model of the head and at least the data points representing the rim curve or edge curve are taken from the three-dimensional model of the virtually adapted and virtually worn spectacle frame.

Clause 36. A computer program for generating a data record used in a method for producing a spectacle lens for the pair of spectacles, the computer program being configured to generate the data record, wherein the data record comprises at least the following data values:
- spatial coordinates of a reference point at each eye of the wearer;
- at least one spatial direction vector for specifying at least one viewing direction of the wearer through the spectacle lens; and
- a spatial rim curve or edge curve, wherein each of the data values is generated from values captured by measurement or from available data.

Clause 37. The computer program according to the preceding clause, wherein the spatial rim curve for edge curve relates to a spectacle frame or a lens edge frame.

Clause 38. The computer program according to either of the two preceding clauses, wherein the reference point on the eye of the wearer is selected from: a pupil center, a pupillary reflex, a corneal apex or a center of rotation of the eye.

Clause 39. The computer program according to any one of the three preceding clauses, wherein the at least one viewing direction of the wearer through the spectacle lens is selected from: a main fixation direction; a principal viewing direction; an activity-specific viewing direction of the wearer, in particular a reading-specific viewing direction of the wearer; a viewing direction of the wearer modified by correction values.

Clause 40. The computer program according to any one of the four preceding clauses, wherein the rim curve or edge curve is provided in the form of a multiplicity of data points, wherein the data points are selected from: edge values of the spectacle frame or of the lens edge frame captured by measurement, in particular by scanning by means of a tracer or from a recording by means of a scanner; design data of the spectacle frame or of the lens edge frame.

Clause 41. The computer program according to any one of the five preceding clauses, wherein all data values are specified in relation to the same spatial coordinate system.

Clause 42. The computer program according to any one of the six preceding clauses, wherein the data record is generated without iterations.

Clause 43. The computer program according to any one of the seven preceding clauses, wherein the data record comprises additional information, wherein the additional information relates to at least one correction of the data values.

Clause 44. The computer program according to the preceding clause, wherein the additional information is incorporated in the data record as at least one further data value.

Clause 45. The computer program according to either of the two preceding clauses, wherein the additional information are included in at least one of the data values of the data record.

Clause 46. The computer program according to any one of the ten preceding clauses, wherein the correction of the data values comprises at least one of the following correction values:
- a spatial change in a head posture of the wearer;
- a change in a vertical coordinate of at least one visual point;
- a change in the spatial direction vector indicating the at least one viewing direction of the wearer through the spectacle lens relative to the viewing direction adopted by the wearer when recording the viewing direction.

Clause 47. A computer-readable storage medium, on which a data record used in a method for producing a spectacle lens is stored, wherein the data record comprises at least the following data values:
- spatial coordinates of a reference point at each eye of the wearer;
- at least one spatial direction vector for specifying at least one viewing direction of the wearer through the spectacle lens; and
- a spatial rim curve or edge curve.

Clause 48. A method for producing a spectacle lens, wherein the spectacle lens is produced by processing a spectacle lens blank, wherein the spectacle lens blank is processed on the basis of centration data, wherein the centration data are ascertained from a data record, wherein the data record comprises at least the following data values:
- spatial coordinates of a reference point at each eye of the wearer;
- at least one spatial direction vector for specifying at least one viewing direction of the wearer through the spectacle lens; and
- a spatial rim curve or edge curve.

Clause 49. The method according to the preceding clause, wherein the spatial rim curve for edge curve relates to a spectacle frame or a lens edge frame.

Clause 50. The method according to either one of the two preceding clauses, wherein a lens type is further included for the purposes of obtaining the centration data, wherein the lens type relates to the spectacle lens selected by the wearer.

Clause 51. The method according to any one of the three preceding clauses, wherein the data record comprises additional information, wherein the additional information relates to at least one correction of the data values.

Clause 52. The method according to the preceding clause, wherein the additional information is incorporated in the data record as at least one further data value.

Clause 53. The method according to either of the two preceding clauses, wherein the additional information are included in at least one of the data values of the data record.

Clause 54. The method according to any one of the three preceding clauses, wherein the correction of the data values comprises at least one of the following correction values:
- a spatial change in a head posture of the user;
- a change in a vertical coordinate of at least one visual point;
- a change in the spatial direction vector indicating the at least one viewing direction of the wearer through the spectacle lens relative to the viewing direction adopted by the wearer when recording the viewing direction.

Clause 55. The method according to the preceding clause, wherein the spatial change in the head posture of the wearer comprises a change
- in a habitual head posture, a correction of a forward tilt of the head of the wearer;
- in a rotation of the head of the wearer; and/or
- in a lateral tilt of the head of the wearer at the time of the image recording.

Clause 56. The method according to one of the two preceding clauses, when the change in the vertical coordinate of the at least one visual point comprises a displacement of a stamp image parallel to the vertical direction of a frame plane of the spectacle frame.

Clause 57. The method according to any one of the nine preceding clauses, wherein all data values are specified in relation to the same spatial coordinate system.

Clause 58. The method according to any one of the ten preceding clauses, wherein the reference point on the eye of the wearer is selected from: a pupil center, a pupillary reflex, a corneal apex or a center of rotation of the eye.

Clause 59. The method according to any one of the eleven preceding clauses, wherein all data values are specified in relation to the same spatial coordinate system.

Clause 60. The method according to any one of the twelve preceding clauses, wherein the data record is generated without iterations.

Clause 61. The method according to any one of the thirteen preceding clauses, wherein the data values of the data record are used to ascertain at least one visual point therefrom.

Clause 62. The method according to the preceding clause, wherein the visual point is ascertained from a point of intersection between the viewing direction of the wearer through the spectacle lens and a lens plane.

Clause 63. The method according to any one of the three preceding clauses, wherein the centration data are selected from at least one of the following centration values:
- distance between the corneal apex of the respective eye and the visual point of a viewing direction through the spectacle lens;
- distances between the visual points and straight lines through the innermost points of the rim curves or edge curves;
- distances between the visual points and straight lines through the lowermost points of the rim curves or edge curves;
- lens length and lens height of a boxed system;
- horizontal distances between the visual points and the vertical centerlines of the boxed system;
- vertical distances between the visual points and the horizontal centerlines of the boxed system;
- distances between the corneal apex of the respective eye and a lens plane;
- angle between the lens planes and the frame plane; and
- angle by which the frame plane is tilted forward out of the perpendicular.

Clause 64. The method according to the preceding clause, wherein
- the spatial coordinates of the position of the reference point at each eye of the wearer;
- the at least one spatial direction vector for specifying the at least one viewing direction of the wearer through the spectacle lens; and
- the spatial rim curve or edge curve are ascertained before the centration data are determined.

Clause 65. The method according to the preceding clause, wherein a lateral tilt of the head is specified as a correction parameter for an axis position of the spectacle lens, wherein the correction parameter is used to correct the centration data or transmitted in addition to the centration data, wherein the lateral tilt of the head of the wearer of the pair of spectacles is derived from at least:
- an angle of a frame horizontal with respect to a spatial horizontal;
- a lateral tilt of the head of a virtual model of a section of the wearer;
- from the relative height of the eyes of the virtual model of the section of wearer; and/or
- a frame horizontal of a spectacle frame virtually put on the virtual model of the section of the wearer.

Clause 66. The method according to any one of the eighteen preceding clauses, wherein the spectacle lens is produced independently of whether the data record is generated from
- at least two images of the wearer, recorded from different directions of view and calibrated to one another, with a worn and adapted spectacle frame, or from at least two two-dimensional rendered recordings of an avatar of the head of the wearer from different directions of view, with a virtually worn and virtually adapted spectacle frame, or from a three-dimensional model of the head, with a virtually worn and virtually adapted spectacle frame.

BRIEF DESCRIPTION OF THE DRAWINGS

Further details and features of the disclosure will become apparent from the following description of typical exemplary embodiments. In this case, the respective features can be realized by themselves or as a plurality in combination with one another. The disclosure is not restricted to the exemplary embodiments. The exemplary embodiments are illustrated schematically in the drawings. In this case, identical reference numerals in the individual drawings designate identical or functionally identical elements or elements corresponding to one another with regard to their functions, wherein.

DESCRIPTION OF EXEMPLARY EMBODIMENTS

Figure 1A:
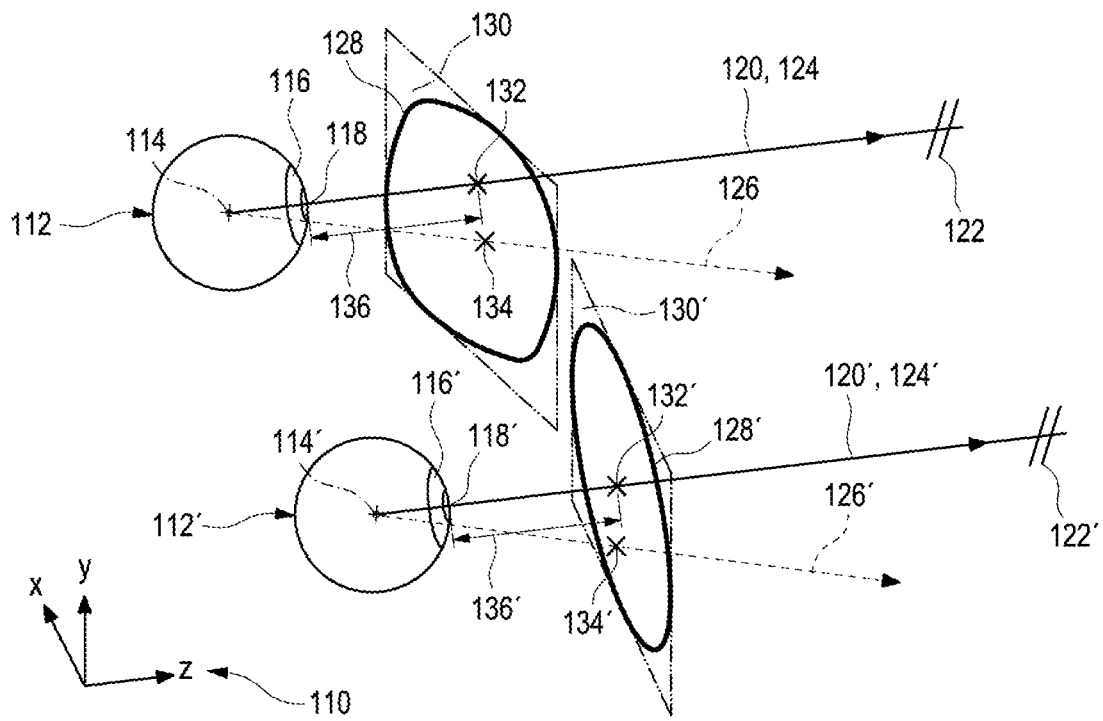
FIG. 1A shows a schematic illustrations of a spatial arrangement of eyes of a user, of viewing directions of the user, and of a rim curve or edge curve in a plan view.

FIG. 1A shows a schematic illustration of a spatial arrangement of elements according to the disclosure within a spatial coordinate system 110, in a plan view. The spatial coordinate system 110 illustrated here is a Cartesian coordinate system, which has coordinates x, y and z, which are perpendicular to one another. Alternatively, a different spatial coordinate system can be used, in particular a cylindrical coordinate system. A spatial coordinate system is distinguished in that three mutually independent values are required for a complete description of the elements situated therein; in the illustration of FIG. 1A, these are specified by providing values for the coordinates of x, y and z.

As illustrated in FIG. 1A, each eye 112, 112' of the wearer (not illustrated) has a center of rotation of the eye 114, 114' as a center of rotation. To this end, the assumption is made that the eye 112, 112' can move in an eye socket like a ball and socket joint around the center of rotation of the eye 114, 114'. Each eye 112, 112' furthermore has a pupil 116, 116', wherein the data value for the spatial coordinates of a reference point at each eye 112, 112' of the wearer can typically be determined from a respective pupil center 118, 118'. Alternatively, a pupillary reflex (not illustrated) that is ascertained from at least one recording of each eye 112, 112' of the wearer by means of image processing can be used to this end. Further reference points at each eye 112, 112' of the wearer and options for the determination thereof are conceivable, in particular the center of rotation of the eye 114, 114' or a corneal apex.

As furthermore shown in FIG. 1A, a respective viewing direction 120, 120' of the wearer through the spectacle lens in each case starts at the respective center of rotation of the eye 114, 114' and passes through the respectively associated pupil 116, 116', in particular the relevant pupil center 118, 118'. In the illustration according to FIG. 1A, the two viewing directions 120, 120' of the wearer are directed to infinity 122, 122' and parallel to one another. In ophthalmic optics, such a viewing direction 120, 120' is usually referred to as a "main fixation direction." Here, the viewing direction 120, 120' can be a principal viewing direction 124, 124' of the user. However, the user could also have one or more further viewing directions through the spectacle lens, for instance a near viewing direction or an activity-specific viewing direction 126, 126', which is likewise plotted schematically in FIG. 1A. The viewing directions 120, 120' of the wearer through the spectacle lens and, if applicable, the one or more further viewing directions, for example the activity-specific viewing directions 126, 126', are each specified as spatial direction vectors, as described in more detail above. The viewing directions 120, 120' of the wearer through the spectacle lens and, if applicable, the one or more further viewing directions, e.g., the activity-specific viewing directions 126, 126', can be determined by measurement, typically by means of the methods and apparatuses presented in WO 2005/069063 A1.

Furthermore, FIG. 1A shows respectively one rim curve or edge curve 128, 128' of a spectacle frame (not illustrated) selected by the wearer of a pair of spectacles, which spectacle frame is configured to receive two spectacle lenses (not illustrated). Each of the rim curves or edge curves 128, 128' typically comprises a multiplicity of data points in this case. Here, each data point of each of the rim curves 128, 128' can comprise an edge value captured by measurement, in particular an inner contour, of the spectacle frame, wherein the edge values of the spectacle frame are ascertained from at least one recording of the wearer, in which the spectacle frame is illustrated. As an alternative or in addition thereto, the data points of the rim curves or edge curves 128, 128' can be captured by measurement in an optical measurement laboratory, typically by means of an optical recording unit, in particular before the spectacle lenses are adapted to the spectacle frame selected by the wearer. To this end, use can typically be made of probing by means of a tracer or recording by means of a scanner. Furthermore alternatively or additionally, the data points of the rim curves or edge curves 128, 128' can be selected from design data of a spatial model of the spectacle frame, typically directly from model data of the producer, for example from CAD data.

While FIG. 1A schematically illustrates the rim curves or edge curves 128, 128' of a pair of full rim spectacles, which has a spectacle frame rim respectively surrounding the two spectacle lenses, the rim curves or edge curves 128, 128' can also be produced in comparable manner by half rim spectacles, in which the two spectacle lenses only partly adjoin a holder, and by rimless spectacles, in which the spectacle lenses each have a bore for receiving a holder. Particularly in the case of half rim spectacles or rimless spectacles, the data points of the rim curves or edge curves 128, 128' can therefore typically comprise edge values of the lens edge frame. In particular, each data point of the rim curves or edge curves 128, 128' can relate to a selected section of the spectacle frame or lens edge frame in this case, for example to a set angular range, typically 0.25° to 10°, particularly typically 0.5° to 2.5°, in particular 1° to 2° of the inner contour of the spectacle frame. Consequently, each of the rim curves or edge curves 128, 128' can have 30 to 1500, typically 36 to 1440, more typically 144 to 720 and in particular 180 to 360 data points. However, other ways of setting the data points of the rim curves or edge curves 128, 128' are possible, for example setting in random or stochastic fashion, or an instance of setting in which more data points relate to labeled points on the rim curve or edge curve 128, 128', for instance to regions of the spectacle frame rim which have an increased curvature in comparison with the entire spectacle frame rim.

Furthermore, FIG. 1A shows the lens planes 130, 130' respectively ascertained from the rim curves or edge curves 128, 128', which lens planes are used to calculate the centration data for the production of spectacle lenses for the spectacle frame selected by the wearer of the pair of spectacles. The lens planes 130, 130' are each formed as plane surfaces that are approximated to the rim curves or edge curves 128, 128', wherein the rim curves or edge curves 128, 128' however generally step out of the lens planes 130, 130' on account of their spatial profile.

From a respective point of intersection of the viewing directions 120, 120' of the wearer with the associated lens planes 130, 130', the visual point 132, 132' of the relevant viewing direction 120, 120' with the respective lens plane 130, 130' can be ascertained therefrom. Analogously, as likewise schematically plotted in FIG. 1A, this can also be implemented for one or more of the further viewing directions, for example for the activity-specific viewing direction 126, 126', as a result of which one or more further visual points 134, 134' can be determined.

Furthermore, this allows a respective distance 136, 136' between the corneal apex of the respective eye 112, 112' and the visual point 132, 132' of the associated viewing direction 120, 120', which is also referred to as "vertex distance," or "HSA" in German, to be determined, wherein the vertex distance represents a centration value comprised by the centration data.

Figure 1B:
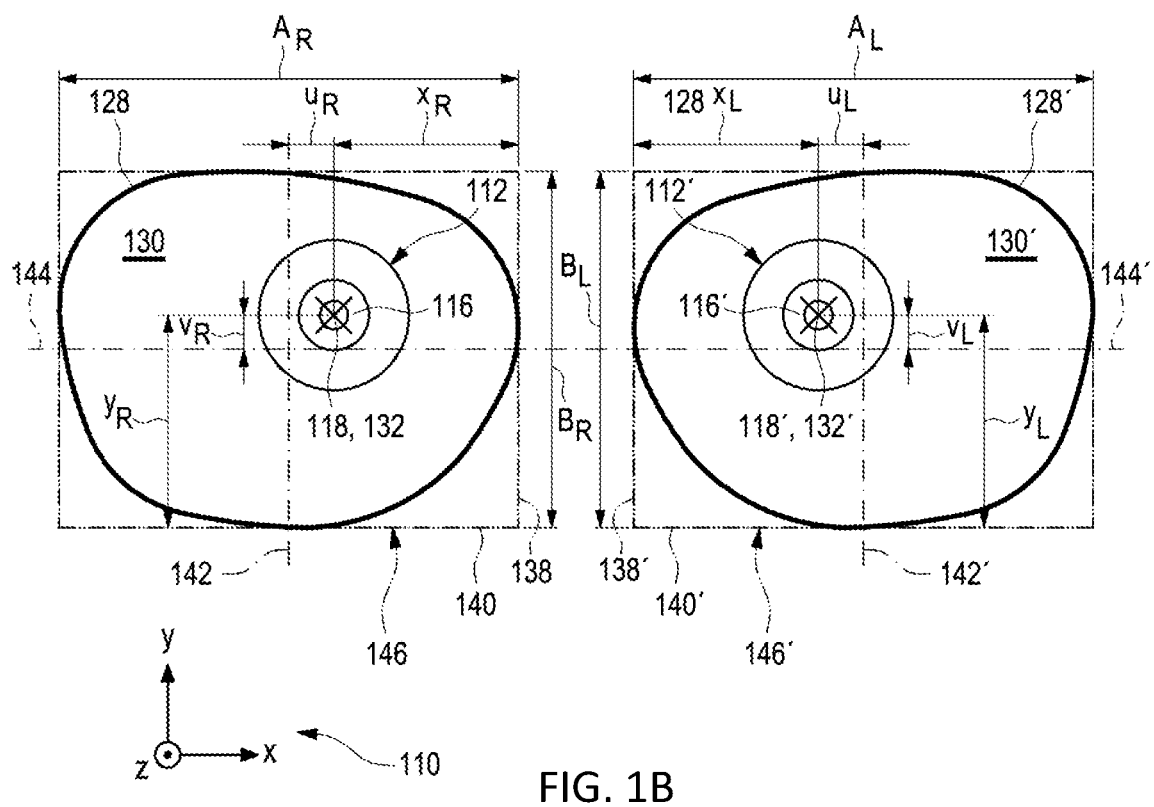
FIG. 1B shows a schematic illustrations of a spatial arrangement of eyes of a user, of viewing directions of the user and of a rim curve or edge curve in a view against the two viewing directions of the user directed at infinity.

FIG. 1B shows a schematic illustration of the same spatial arrangement of the elements according to the disclosure within the spatial coordinate system 110 according to FIG. 1A, in a view against the two viewing directions 120, 120' of the user directed at infinity 122, 122', the viewing directions each starting from the respective center of rotation of the eye 114, 114' (not illustrated here) and passing through the respectively associated pupil 116, 116', in particular the relevant pupil center 118, 118'. As illustrated in FIG. 1A, the visual point 132, 132' and, if applicable, the at least one further visual point 134, 134' (not illustrated here) can be respectively ascertained therefrom in each of the lens planes 130, 130'. From the respective position of the visual point 132, 132', it is possible as shown in FIG. 1B, to undertake a calculation of further centration values that are comprised by the centration data, in particular distances $x_L$, $x_R$ between visual points 132, 132' and straight lines 138, 138' through innermost points of the rim curves or edge curves 128, 128';

distances $y_L$, $y_R$ between visual points 132, 132' and straight lines 140, 140' through lowermost points of the rim curves or edge curves 128, 128';

horizontal distances $u_L$, $u_R$ between the visual points 132, 132' and vertical centerlines 142, 142' of the boxed system 146, 146'; and vertical distances $v_L$, $v_R$ between the visual points 132, 132' and horizontal centerlines 144, 144' of the boxed system 146, 146'.

Moreover, the centration data can typically comprise the following further centration values:

horizontal distances $A_L$, $A_R$ between inner and outer vertical boundaries of rectangles of the boxed system 146, 146' that circumscribe the rim curves or edge curves 128, 128' and are located in the lens plane 130, 130'; and vertical distances $B_L$, $B_R$ between upper and lower horizontal boundaries of the rectangles of the boxed system 146, 146' that circumscribe the rim curves or edge curves 128, 128' and are located in the lens plane 130, 130', and so, in contrast to the DIN EN ISO 13666:2013-10 standard, the horizontal distances $A_L$, $A_R$ and the vertical distances $B_L$, $B_R$ can differ from one another for each of the lens planes 130, 130'.

In the context of the centration data, reference is made to the fact that the indices L and R denote the left and right directions, wherein the directions should be considered from the view of the wearer of the pair of spectacles.

Figure 1C:
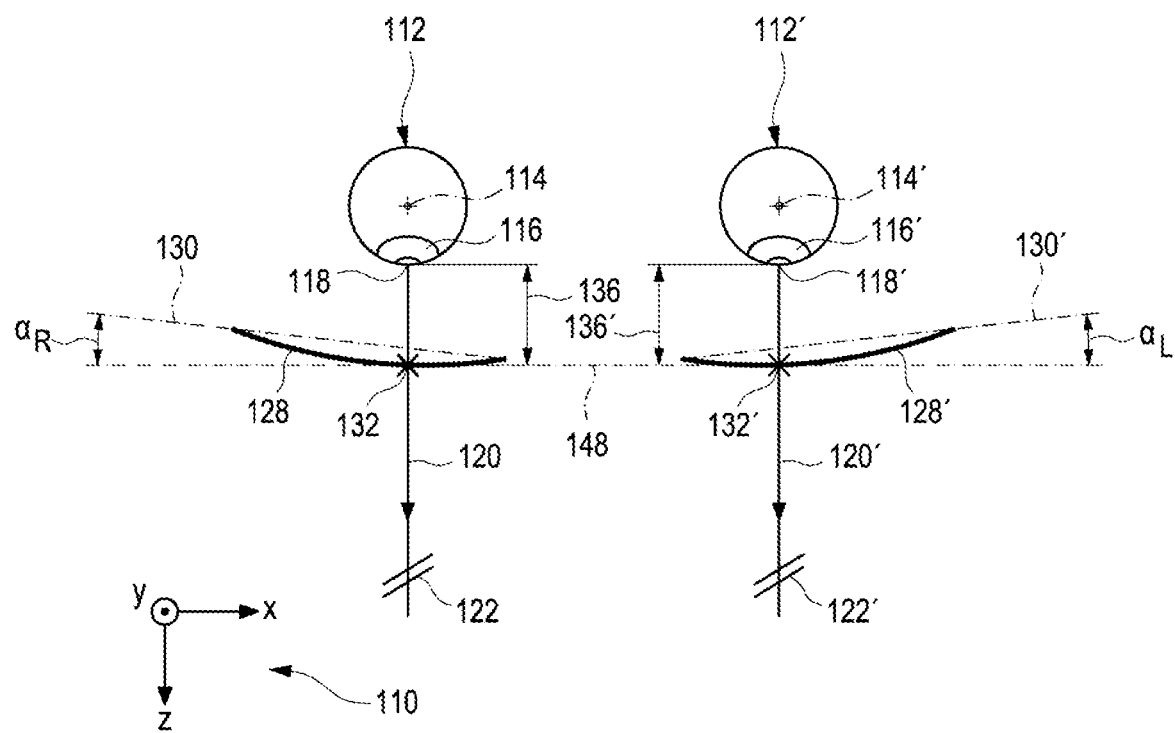
FIG. 1C shows a further schematic illustrations of a spatial arrangement of eyes of a user, of viewing directions of the user and of a rim curve or edge curve in a plan view.

As emerges from FIG. 1C, which shows a further schematic illustration of the same spatial arrangement of the elements according to the disclosure within the spatial coordinate system 110 according to FIGS. 1A and 1B in a plan view, a calculation of further centration values comprised by the centration data can likewise be undertaken from the respective position of the visual point 132, 132', in particular:

distances 136, 136' between the corneal apex of the respective eye 112, 112' and a frame plane 148, which is set as the central plane of the spectacle frame;

an angle $\alpha_L$, $\alpha_R$ between the lens planes 130, 130' and the frame plane 148; and an angle (not illustrated), which is also referred to as "pantoscopic angle," by which the frame plane 148 is tilted forward out of the perpendicular, i.e., in relation to the y-coordinate of the spatial coordinate system 110.

Consequently, all centration values comprised by the centration data, which are used for producing the spectacle lenses for the spectacle frame 150 selected by the wearer of the pair of spectacles, can already be determined only from knowledge of the data values of the spatial coordinates of the position of the respective reference point at each of the two eyes 112, 112' of the wearer;

at least one spatial direction vector for specifying at least one viewing direction 120, 120' of the wearer through the spectacle lens; and a spatial rim curve or edge curve 128, 128' of the spectacle frame or a lens edge frame.

What is particularly advantageous here is that, during the subsequent selection of the lens type and hence the selection of the associated centration prescription, the centration data can be determined in each case from the specified data values without new measurements having to be conducted on the wearer and/or the spectacle frame. Moreover, it is the rim curves or edge curves 128, 128' themselves that are used in this case, and not a projection of the rim curves or edge curves 128, 128' onto the lens planes 130, 130'.

Figure 1D:
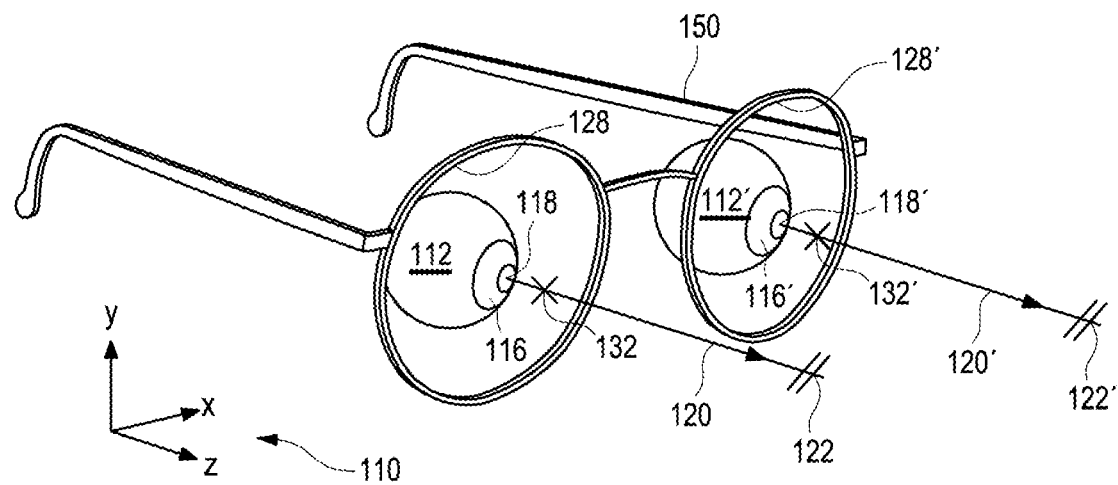
FIG. 1D shows a schematic illustrations of a spatial arrangement of eyes of a user, of viewing directions of the user and of a rim curve or edge curve in the viewing of the wearer through the spectacle lens.

Finally, FIG. 1D shows a further schematic illustration of the spatial arrangement of the eyes 112, 112' of the wearer, of the viewing direction 120, 120' of the wearer through the spectacle lens and of the rim curves or edge curves 128, 128' of the spectacle frame 150.

In particular, the determination of the centration data according to the disclosure requires no assumption of symmetric parameters in relation to the two sides, the right and left, of the user and hence of the selected spectacle frame 150 and the spectacle lenses to be provided therefor. An example to this end is that the vertex distances 136, 136' for the respective eyes 112, 112' of the user can deviate from one another. A further typical example can have different values for sides A and B of the boxed system 146, 146', which, in a manner complementing the standard, now are able to adopt respectively different values for the right and left, i.e., for $A_L$ and $A_R$ and/or for $B_L$ and $B_R$. A further example to this end is the aforementioned change in the axis position of the spectacle lens on account of a lateral tilt of the head of the wearer.

Figure 2:
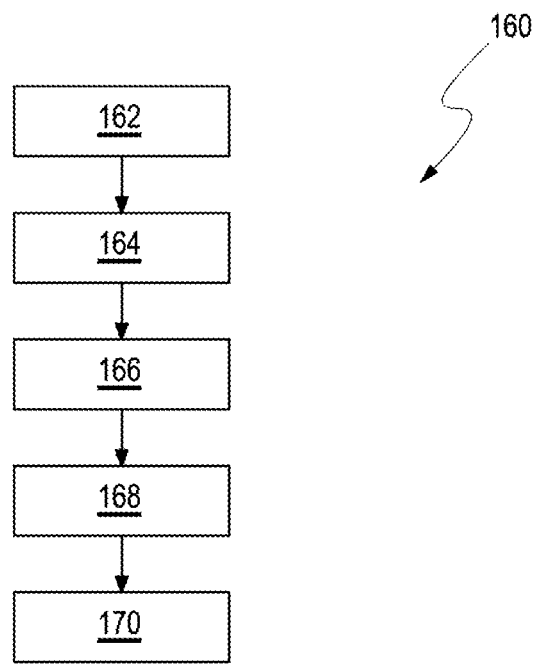
FIG. 2 shows a flowchart of an exemplary embodiment of a method according to the disclosure for producing a spectacle lens.

FIG. 2 schematically shows a flowchart of a typical exemplary embodiment of a method 160 according to the disclosure for producing a spectacle lens.

Here, the correction 162 of the wearer of the pair of spectacles can be determined in a first method step. In this method step, required correction of refractive errors of the wearer of the pair of spectacles can be undertaken, in particular, wherein use is made of already known values captured by measurements, for example from an ophthalmic prescription from the user, and/or wherein an objective refraction of each pupil of the wearer can be ascertained by performing a refraction determination using a known refractometer.

In a further method step, the spectacle lens 150 can be selected 164, in particular by the wearer.

In a further method step, the data record according to the disclosure can be generated 166, wherein the data record, as specified above, at least comprises the following data values:

spatial coordinates of a position of a reference point at each eye 112, 112' of the wearer;
at least one spatial direction vector for specifying at least one viewing direction 120, 120' of the wearer through the spectacle lens; and
a spatial rim curve or edge curve 128, 128', in particular of the spectacle frame 150 or a lens edge frame, wherein each of the data values is generated from values captured by measurement or from available data.

These data can be taken through the spectacle lens by means of centration recording with a pair of spectacles worn by the user with a habitual head posture and a defined viewing direction 120, 120' of the user. As an alternative thereto, use can be made of a virtual model of a section of the user, in particular of the head of the user, which is also referred to as an "avatar," wherein at least one spectacle frame 150, which is available as a spatial model, is placed on the avatar.

In a further method step, the user can select 168 the lens type, wherein the lens selection, as described above, may comprise the lens type, a refractive index, a tint and at least one coating of the spectacle lenses.

The centration data can be determined 170 in a further method step. After the generation 166 of the above-described data record and the selection 168 of the lens type by the wearer, in particular after the lens type for the spectacle lenses has been set, it is consequently possible to ascertain the centration prescription for adapting the spectacle lenses to the spectacle frame 150 and to subsequently use the latter to produce the spectacle lenses.

Should there subsequently be a change in the selection 168 of the lens type by the user or by the optician, the data record generated during the method step 166, which comprises at least the aforementioned data values, thus can be adopted unchanged for determining 170 the centration data.

Consequently, the determination 170 of the centration data and the ascertainment of the centration prescription can advantageously be implemented without iteration by undertaking a simple successive procedure.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

110 Spatial coordinate system
112, 112' Eye
114, 114' Center of rotation of the eye
116, 116' Pupil
118, 118' Pupil center
120, 120' Viewing direction of the wearer through the spectacle lens
122, 122' Infinity
124, 124' Principal viewing direction
126, 126' Activity-specific viewing direction
128, 128' Rim curve or edge curve
130, 130' Lens plane
132, 132' Visual point
134, 134' Further visual point
136, 136' Vertex distance
138, 138' Straight lines through innermost points of the rim curve or edge curve
140, 140' Straight lines through lowermost points of the rim curve or edge curve
142, 142' Vertical centerline
144, 144' Horizontal centerline
146, 146' Boxed system
148 Frame plane
150 Spectacle frame
160 Method for producing a spectacle lens
162 Determining the correction
164 Selecting the spectacle frame
166 Generating the data record according to the disclosure
168 Selecting the lens equipment
170 Determining the centration data

The invention claimed is:

1. A non-transitory storage medium storing a data record for use in a method for producing a spectacle lens from a spectacle lens blank based on centration data, the data record comprising at least the following data values:

spatial coordinates of a reference point at each eye of a wearer;
at least one spatial direction vector for specifying at least one viewing direction of the wearer through the spectacle lens; and a spatial rim curve or edge curve,
wherein the data record further contains additional information, and wherein the additional information relates to at least one correction of a data value,
  wherein all centration values included by the centration data, which are used for producing the spectacle lens for a spectacle frame selected by a wearer of a pair of spectacles, have already been determined only from knowledge of the data values of the data record, or
  wherein the data values of the data record are used directly to optimize a front surface and a back surface of the spectacle lens.

2. The non-transitory storage medium of claim 1, wherein all data values are specified in relation to a same spatial coordinate system.

3. The non-transitory storage medium of claim 1, wherein the reference point on the eye of the wearer is selected from: a pupil center, a pupillary reflex, a corneal apex, or a center of rotation of the eye.

4. The non-transitory storage medium of claim 1, wherein the at least one viewing direction of the wearer through the spectacle lens is selected from: a main fixation direction, a principal viewing direction, an activity-specific viewing direction of the wearer, or a viewing direction of the wearer modified by a correction value.

5. The non-transitory storage medium of claim 1, wherein the rim curve or edge curve is available as a multiplicity of data points, and wherein the multiplicity of data points is selected from: edge values of a spectacle frame or a lens edge frame captured by measurement, design data of the spectacle frame or of the lens edge frame.

6. The non-transitory storage medium of claim 1, wherein the additional information is incorporated in the data record as at least one additional data value or wherein the additional information is included in at least one of the data values of the data record.

7. The non-transitory storage medium of claim 1, wherein the correction of the data values comprises at least one of the following correction values:
  a spatial change in a head posture of the wearer;
  a change in a vertical coordinate of at least one visual point; or
  a change in the spatial direction vector indicating the at least one viewing direction of the wearer through the spectacle lens relative to the viewing direction adopted by the wearer when recording the viewing direction.

8. The non-transitory storage medium of claim 7, wherein the spatial change in the head posture of the wearer comprises a change in at least one of:
  a habitual head posture;
  a correction of a forward tilt of the head of the wearer;
  a rotation of the head of the wearer; or
  a lateral tilt of the head of the wearer at a time of an image recording.

9. The non-transitory storage medium of claim 7, wherein the change in a vertical coordinate of the at least one visual point comprises a displacement of a stamp image parallel to the vertical direction of a frame plane of the spectacle frame.

10. A method for generating a data record used in a method for producing a spectacle lens from a spectacle lens blank based on centration data, wherein the data record comprises at least the following data values:
  spatial coordinates of a reference point at each eye of the wearer;
  at least one spatial direction vector for specifying at least one viewing direction of a wearer through the spectacle lens; and
  a spatial rim curve or edge curve, the method comprising:
    generating each of the data values from values captured by measurement or from available data,
    wherein the data record contains additional information, and wherein the additional information relates to at least one correction of the data values,
      wherein all centration values included by the centration data, which are used for producing the spectacle lens for a spectacle frame selected by a wearer of a pair of spectacles, have already been determined only from knowledge of the data values of the data record, or
      wherein the data values of the data record are used directly to optimize a front surface and a back surface of the spectacle lens.

11. The method of claim 10, wherein each of the data values is captured with an optical measuring device, and wherein at least one frontal recording of the wearer and at least one lateral recording of the wearer are made simultaneously in relation to the viewing direction of the wearer while the wearer wears the spectacle frame.

12. The method of claim 11, wherein a virtual model of a section of the wearer is created from the at least one frontal recording of the wearer and the at least one lateral recording of the wearer, wherein the section of the wearer includes at least each eye of the wearer and a part of the wearer readied to wear the spectacle frame, and wherein the spectacle frame is worn by the virtual model.

13. A method for producing a spectacle lens, wherein the spectacle lens is produced by processing a spectacle lens blank, wherein the spectacle lens blank is processed based on centration data, and wherein the centration data are ascertained from a data record, the method comprising:
  providing the data record containing at least the following data values:
    spatial coordinates of a reference point on the eye of the wearer;
    at least one spatial direction vector for specifying at least one viewing direction of the wearer through the spectacle lens; and
    a spatial rim curve or edge curve,
  wherein the data record contains additional information, and wherein the additional information relates to at least one correction of a data value,
    wherein all centration values included by the centration data, which are used for producing the spectacle lens for a spectacle frame selected by a wearer of a pair of spectacles, have already been determined only from knowledge of the data values of the data record, or
    wherein the data values of the data record are used directly to optimize a front surface and a back surface of the spectacle lens.

14. The method of claim 13, wherein the centration data are selected from at least one of the following centration values:
  a distance between the corneal apex of the respective eye and a visual point of a viewing direction;
  distances between visual points and straight lines through innermost points of the rim curves or edge curves;
  distances between visual points and straight lines through lowermost points of the rim curves or edge curves;
  horizontal distances between inner and outer vertical boundaries of rectangles of a boxed system that circumscribe the rim curves or edge curves and are located in a lens plane;

vertical distances between upper and lower horizontal boundaries of the rectangles of the boxed system that circumscribe the rim curves or edge curves and are located in the lens plane;

horizontal distances between the visual points and vertical center lines of the boxed system;

vertical distances between the visual points and horizontal center lines of the boxed system;

distances between the corneal apex of the respective eye and the lens plane;

an angle between the lens planes and the frame plane; or an angle by which the frame plane is tilted forward out of the perpendicular.

15. The method as claimed in claim 13, wherein the spectacle lens is produced independently of whether the data record is generated:

from at least two images of the wearer, recorded from different directions of view and calibrated to one another, with the worn and adapted spectacle frame; or from at least two two-dimensional rendered recordings of an avatar of the head of a wearer captured from different directions of view, with the virtually worn and virtually adapted spectacle frame; or from a three-dimensional model of the head, with the virtually worn and virtually adapted spectacle frame.

* * * * *